United States Patent [19]
Kornfield et al.

[11] Patent Number: 5,313,320
[45] Date of Patent: May 17, 1994

[54] METHOD FOR ALIGNING SIDE-GROUP LIQUID-CRYSTALLINE POLYMERS

[75] Inventors: Julia A. Kornfield; Rangaramanujam M. Kannan, both of Pasadena, Calif.; Norbert Schwenk, Wiesbaden, Fed. Rep. of Germany

[73] Assignee: California Institute of Technology, Pasadena, Calif.

[21] Appl. No.: 33,045

[22] Filed: Mar. 18, 1993

[51] Int. Cl.$^5$ ............................................. G02F 1/133
[52] U.S. Cl. ......................................... 359/76; 359/46
[58] Field of Search ..................................... 359/76, 46

[56] References Cited

U.S. PATENT DOCUMENTS

| | | | |
|---|---|---|---|
| 4,388,453 | 6/1983 | Finkelmann et al. | 528/15 |
| 4,410,570 | 10/1983 | Kreuzer et al. | 427/374.1 |
| 4,702,558 | 10/1987 | Coles et al. | 359/76 |
| 4,793,949 | 12/1988 | Mathias et al. | 260/404 |
| 4,801,734 | 1/1989 | Kock et al. | 560/73 |
| 4,822,682 | 4/1989 | Dorsch et al. | 428/411.1 |
| 4,837,745 | 6/1989 | Eich et al. | 365/108 |
| 4,894,180 | 1/1990 | Takayanagi et al. | 252/299.01 |
| 4,904,066 | 2/1990 | Gray et al. | 359/104 |
| 5,023,859 | 6/1991 | Eich et al. | 365/113 |
| 5,024,784 | 6/1991 | Eich et al. | 252/299.01 |
| 5,032,009 | 7/1991 | Gibbons et al. | 359/76 |
| 5,097,463 | 3/1992 | Wagenblast et al. | 369/110 |
| 5,098,978 | 3/1992 | Riepl et al. | 528/15 |
| 5,231,525 | 7/1993 | Yuasa et al. | 359/76 |

OTHER PUBLICATIONS

J. Kornfeld et al., Simultaneous Mechanical and Infrared Dichroism Measurements of Polymer Dynamics, ACS Polymer Preprints, vol. 33, Apr. 1992, pp. 90–91.

P. Fabre and M. Veyssie, Shear Viscosity Experiment in Side-Chain Nematic Polymers, Mol. Cryst. Liq. Cryst. Letters, vol. 4(3–4) pp. 99–105, 1987.

Rudolf Zentel, Jishan Wu, Rheological Properties of Liquid-Crystalline Side-Group Polymers in the Isotropic, Nematic, and Smectic States, Institute fur Makromolekulare Chemie, Jun. 25, 1985.

Primary Examiner—William L. Sikes
Assistant Examiner—Huy Mai
Attorney, Agent, or Firm—Poms, Smith, Lande & Rose

[57] ABSTRACT

A method for converting an opaque portion of a side-group liquid crystalline polymer body into a transparent portion. The method involves applying sufficient shear force to the polymer body for a sufficient time to convert the opaque portion into a transparent portion. The method provides for erasure of opaque optical pixels from data storage disks without requiring the use of electrical or magnetic fields.

23 Claims, 3 Drawing Sheets

METHOD FOR ALIGNING SIDE-GROUP LIQUID-CRYSTALLINE POLYMERS

BACKGROUND OF THE INVENTION

1. Field of the Invention

The present invention relates generally to side-group liquid-crystalline polymers which, among other things are utilized as optical data storage media. More particularly, the present invention relates to methods for aligning the nematic phase of such liquid crystalline polymers in order to provide for erasure of stored optical data.

2. Description of Related Art

The publications and other reference materials referred to herein to describe the background of the invention and to provide additional details regarding its practice are hereby incorporated by reference. For convenience, the reference materials are numerically referenced and identified in the appended bibliography.

Liquid-crystalline polymers (LCPs) offer a wide range of valuable material properties (1). The most familiar example is the outstanding tensile strength of fibers and films manufactured from main-chain liquid-crystalline polymer solutions or melts. Their strength arises from the enhanced molecular orientation that is achieved when extensional deformation is applied to a fluid with local orientational order.

Another type of liquid-crystalline polymer has the mesogenic group pendant to the polymer backbone as a side-group or side-chain. The side-group LCPs have been developed for potential optical applications as holographic information storage media or nonlinear optical materials (2).

For optical data storage, a plate formed from the side-group LCP is annealed in an orienting field to yield a sample that has uniform molecular orientation or alignment. The resulting "monodomain" material provides a transparent, highly birefringent background onto which opaque elements can be written by local heating with laser light. The laser is used to heat a spot as small as $10\mu$ in diameter through the nematic to isotropic transition. When the spot cools in the absence of an applied field, it leaves a region (pixel) that is riddled with orientation defects. This island of "polydomain" material strongly scatters light, and is consequently opaque. Both the monodomain and polydomain states can be frozen-in by cooling through the glass transition of the polymer.

The present established method for erasing the opaque pixels once they are written is slow and cumbersome. The method involves producing uniform macroscopic orientation by prolonged annealing in a high electric or magnetic field or by contact with an orienting surface. As a result of the slow erasure procedure, side-group LCP materials have been viewed primarily as long term (write once read many times, or WORM) storage media. In order to expand the use of side-group LCPs into read-write-erase data-storage media, a convenient, quick and simple method must be provided which is capable of providing uniform orientation or alignment of the side-group LCP. In addition, if a convenient method for erasing opaque data regions can be developed, the use of side-group LCPs may also expand into thermal and optical sensors.

Considerable work has been conducted to investigate the rheology of main chain (3) and rigid-rod (4) polymer liquid crystals. However, very few studies have been made that investigate the rheology of side-group liquid crystalline polymers. Accordingly, no methods have been developed to erase the opaque pixels in side-group LCPs using flow. Of the few studies which have been conducted on the flow behavior side-group liquid crystalline polymers, one study concluded that the use of shear or shear flow could not be used to enhance the orientational order or align side-group liquid crystalline polymers (5).

As is apparent from the above, there is a continuing need to investigate and develop new methods for aligning side-group liquid crystalline polymers so that their use in potential optical applications as data storage media and thermal and optical sensors can be expanded.

SUMMARY OF THE INVENTION

In accordance with the present invention, a method is provided wherein macroscopically disoriented opaque portions of side-group liquid crystalline polymers are oriented and aligned to convert the opaque portion into a transparent portion. The method of the present invention is based upon the discovery that shear forces applied to side-group liquid crystalline polymer materials can provide an effective means for orienting the polymer material to convert opaque portions into transparent portions.

Contrary to conventional wisdom, as exemplified by the study (5) mentioned above, it was discovered that opaque portions of side-group liquid crystalline polymers can be easily, quickly and conveniently made transparent by subjecting the polymer to low frequency oscillatory shear forces. In accordance with the present invention, it was discovered that the application of shear forces alone, without the need for electric or magnetic fields, effectively aligns the opaque macroscopically disoriented portions of side-group liquid crystalline polymers to produce a transparent portion. The method of the present invention is particularly well-suited for use in erasing opaque pixels present on optical data storage plates made from side-group liquid-crystalline polymers.

As a feature of the present invention, it was discovered that application of oscillatory shear having a frequency of between about 0.001 Hz to about 16 Hz is sufficient to convert opaque portions of side-group liquid crystalline polymers into transparent portions provided that the oscillatory shear force applied during the shear cycles produces an oscillatory strain in the polymer of between about 30 to 100%. As a further feature of the present invention, it was discovered that on the order of 100 oscillatory shear cycles or more are required in order to achieve desired conversion from an opaque portion to a transparent portion.

The above features and attendant advantages will become better understood by reference to the following detailed description when taken in conjunction with the accompanying drawings.

DETAILED DESCRIPTION OF THE PREFERRED EMBODIMENTS

The present invention involves a method for converting an opaque portion of a nematic side-group liquid-crystalline polymer into a transparent portion. The method of the present invention is especially well-suited for use in aligning and re-aligning liquid crystal media used in optical data storage apparatus. Such systems and prior art methods for re-aligning the liquid crystal media are set forth in U.S. Pat. Nos. 5,032,009; 5,023,859; 5,097,463; 4,904,066; 4,894,180; 4,702,558; 5,024,784; 4,896,292; 4,837,745; and 5,098,978. The contents of these patents are hereby incorporated by reference.

Although the method of the present invention is especially well-suited for use in treating polymers of the type disclosed in the above patents to align and re-align the molecular orientation, it will be apparent to those skilled in the art that the method of the present invention has wide application to any situation where it is desired to convert opaque portions of nematic side-group liquid crystalline polymers into transparent portions. Accordingly, although the following detailed description will be directed principally to the erasure of opaque portions from optical data storage plates, it will be understood by those skilled in the art that the invention is not so limited.

Figure 2:
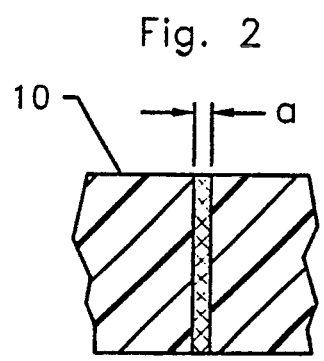
FIG. 2 is a sectional view of the polymer plate of FIG. 1 taken in the 2—2 plane showing one of the opaque portions or pixels of the polymer plate.
Figure 1:
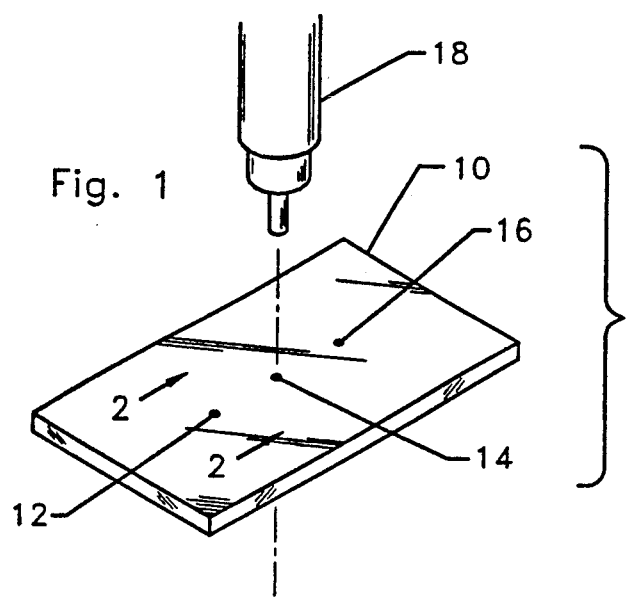
FIG. 1 is a diagrammatic view showing a plate of side group liquid crystalline polymer in which opaque pixels of information are being written with a laser.

Referring to FIG. 1, the present invention is designed for use in connection with optical data storage systems in which a transparent polymer plate 10 is used as the optical data storage media. Data is stored on plate 10 by localized heating of discrete areas to form opaque portions 12, 14 and 16. These opaque portions or pixels can be extremely small (on the order of 10$\mu$) and are preferably formed by discrete heating using a laser as represented at 18. As shown in FIG. 2, the opaque pixels extend as a discrete column (a) which may or may not extend entirely through the polymer plate 10.

Figure 3:
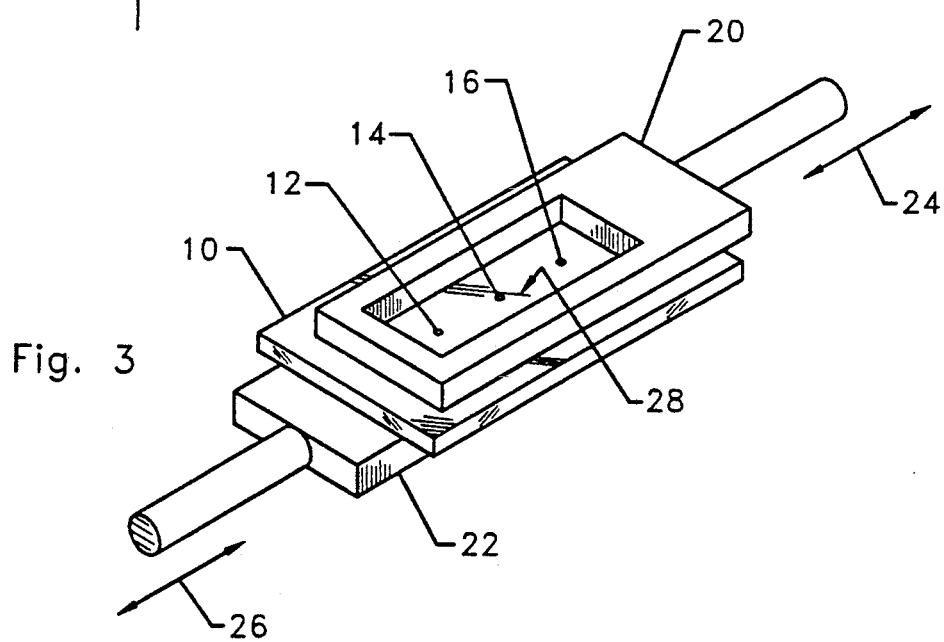
FIG. 3 is a perspective view of an exemplary apparatus for use in applying oscillatory shear to the side-group liquid crystalline polymer plate in accordance with the present invention to convert the opaque portions of the plate to transparent portions.

In accordance with the present invention, the opaque portions 12, 14 and 16 in plate 10 are removed by subjecting the plate to an oscillatory shear force which is sufficient to convert the opaque portions 12, 14, and 16 back into transparent portions. A preferred exemplary system for applying oscillatory shear forces to plate 10 is shown in FIG. 3. The system includes a top shear plate 20 and a bottom shear plate 22. The top shear plate 20 is securely attached to the top of polymer plate 10 and the bottom shear plate 22 is securely attached to the bottom of polymer plate 10. The attachment of the shear plates to the polymer plate 10 can be accomplished in any number of different ways. The plates can include various auxiliary devices to assist in securing the polymer plate between the shear plates. The shear plates may be glued to the polymer plate or the shear plates may be pressed together to a sufficient degree to prevent slippage of the polymer plate during application of shear.

In accordance with the present invention, the shear plates 20 and 22 are moved in the direction shown by arrows 24 and 26 to provide oscillatory shear forces which are sufficient to convert the opaque portions of plate 10 to transparent portions. Preferably, the shear plates 20 and 22 will have openings such as the one shown at 28 to allow visual inspection of the opaque portions in order to determine when sufficient oscillatory shear forces have been applied to the polymer plate 10 in order to completely convert the opaque portions to transparent portions.

For the majority of side-group liquid-crystalline polymers, an oscillatory shear cycle having a frequency of between about 0.001 Hz to about 16 Hz is preferred. The shear force which is applied during the shear cycles is preferably sufficient to obtain an oscillatory strain of between about 30 to 100%. The number of oscillatory cycles required to convert the opaque portions of the plastic plate to transparent portions will vary greatly depending upon the amplitude of the shear strain and the temperature at which the operation is performed. Generally, it is preferred that at least 100 oscillatory shear cycles be applied to the plate 10 in order to ensure substantially complete transition from the opaque condition to the transparent condition.

Preferably, the temperature of the polymer plate 10 will be maintained at a temperature which is between $T_g$ and 5° C. below the nematic-to-isotropic transition for the particular side-group liquid-crystalline polymer or polymers present in plate 10. As a result the polymer will be in a liquid-crystalline phase during application of shear forces. It is preferred that the shear forces be applied as an oscillatory shear force; however, the shear force can be applied in any manner desired provided that it is of sufficient duration and strength to convert the opaque portions to the transparent portions.

The oscillatory shear erasure method of the present invention may be used to erase opaque portions or pixels from a wide variety of polymers which may be in a wide variety of shapes. Preferably, the polymer will be in the shape of a plate having a thickness of a few mils up to plates having thicknesses on the order of an inch or more. The method also may be applied to plates having relatively large surface areas with the only limitation being the ability to uniformly apply low frequency oscillatory shear forces to the plate material.

Figure 4:
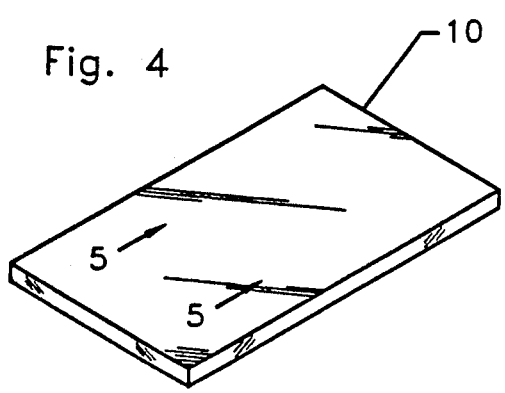
FIG. 4 is a perspective view of the side-group liquid crystalline polymer plate after it has been subjected to oscillatory shear in accordance with the present invention.
Figure 5:
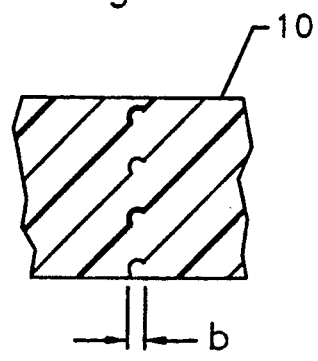
FIG. 5 is sectional view of FIG. 4 taken in the 5—5 plane and showing the portion of the polymer plate where the opaque portion has been erased and converted into a transparent portion.

FIG. 4 depicts the plate 10 after it has been subjected to the method of the present invention for a sufficient time that opaque portions 12, 14 and 16 have been converted back to transparent portions. FIG. 5 is a sectional view of FIG. 4 which further depicts and emphasizes the total conversion of the opaque portion to a re-aligned transparent portion as shown at (b).

Although the present invention is well-suited for use in erasing opaque portions from a variety of liquid-crystalline polymers, the present invention is especially well-suited for use in connection with side-group liquid-crystalline polymers having mesogenic groups pendent to the flexible backbone chain. Mesogenic groups are chemical moieties that have sufficiently anisotropic shape and dielectric properties to induce orientational order in the liquid state. Exemplary polymers are disclosed in the previously cited patents and include polymers having backbone structures of polyacrylate, polymethacrylate, polychloroacrylate, polysiloxane and polyvinylbenzyl-ether with side-groups of various alkyl spacer length (typically 2, 4 or 6 methylene units) and mesogens with structures that are derivatives of phenylbenzoate, substituted biphenyl, diphenyl ethane, or azobenzene units. These may be homopolymers or copolymers.

A preferred polymer is polymethacrylate with a 6-methylene unit spacer between the polymer backbone and the mesogen. Preferred mesogens include phenylbenzoate biphenyl, azobenzene, and derivatives thereof such as:

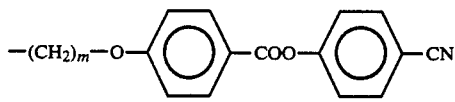

where m = 0–11;

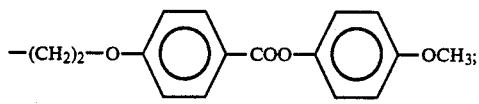

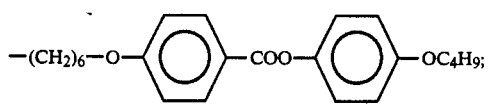

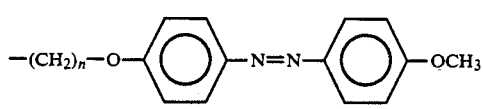

where n = 0–10; and

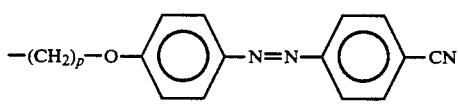

where p = 0–10.

A preferred polymer includes a methacrylate backbone, a six methylene spacer and a phenyl-benzoate mesogenic group. This preferred polymer has the following structure and is referred to as PM6M.

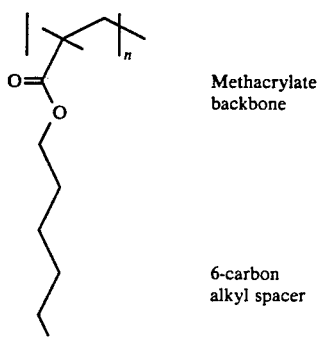

Methacrylate backbone 6-carbon alkyl spacer

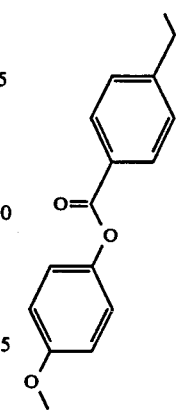

phenylbenzoate mesogen where n is from 100 to 10,000.

Examples of Practice are as follows:

A polymethacrylate polymer (PM6M) was prepared by first synthesizing monomers in a three step reaction and then polymerizing the monomers. The first step was etherification of HBA (hydroxybenzoic acid) with 6-chloro-hexanol. The second step was an esterification with 4-methyoxyphenol using the DCCI-method (dicyclocarbodiimide) [6]. In the final step, the resulting functional alcohol was reacted with methacrylic acid. The monomer was purified using medium pressure liquid chromatography (Kieselgel HD-SIL 60 Å, 16–24 μm, t-butyl-methyl-ether/cyclohexane=1:3).

The PM6M polymer was obtained by a free radical polymerization in 2-butanol with 0.5 mol % azoisobutyronitrile (AIBN) as an initiator at 60° C. [7]. Molecular weight was determined by GPC using a standard of the same side-group liquid-crystalline polymer obtained from narrow molecular weight fractions with light scattering calibration [8]. Thermal characterization was done using DSC and DTA (Mettler DSC 30). Decomposition of the material started above 590K (320° C.), indicating that the material was thermally stable under the conditions of the flow experiments. This was confirmed by repeating thermal characterization of samples after the rheological experiments were completed.

Molecular weight fractions of the PM6M from 200,000 to 1,000,000 g/mol with polydispersity ($M_w/M_n$) of approximately 1.2 were isolated using fractional precipitation. The glass-to-nematic and nematic-to-isotropic transition temperatures were found to be nearly equal for all of the fractions, with $T_g$ equal to approximately 50° C. and $T_{ni}$ equal to approximately 115° C. The following examples use the $2.5 \times 10^6$ g/mol fraction of the PM6M polymer.

Figure 6:
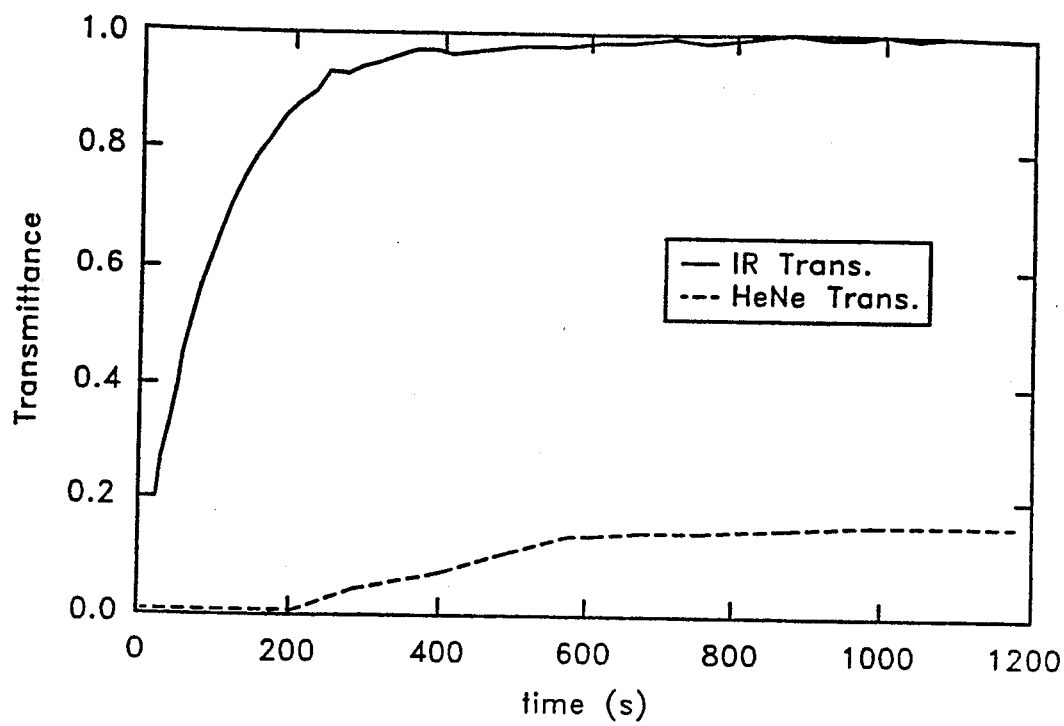
FIG. 6 is a graph showing the time dependence of the transmittance of a side-group liquid-crystalline polymer (PM6M) during application of 200 cycles of sinusoidal shear at 1 rad/s frequency and 40% strain amplitude.

The PM6M was cooled from 120° to 110° C., allowed to equilibrate for 20 minutes, and then subjected to 200 cycles of 40% oscillatory strain at a frequency of 1 rad/s. To monitor the concentration of scatters in the polydomain sample, the intensity of light transmitted by the sample in the isotropic state is taken as the reference for a transmittance of unity. When the sample is cooled into the nematic phase, the transmittance drops to below $10^{-3}$ for both infrared and visible light. If no strain is applied, the sample remains opaque. During oscillatory shear, the transmittance increases as shown in FIG. 6. The transmittance at 4.53μ increases more rapidly than that at 0.63μ, the former reaching 90% transmittance after about 50 cycles (300s) and the latter reaching 15% after about 130 cycles (800s). After 200 cycles the sample appears transparent to the eye.

Figure 7:
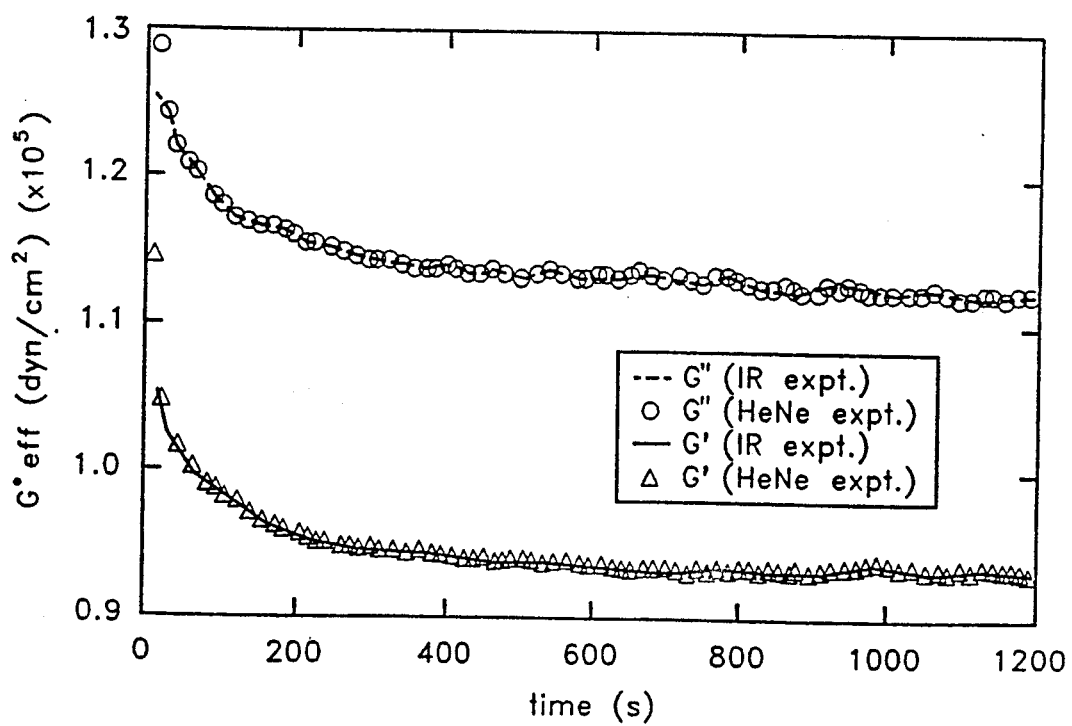
FIG. 7 is a graph showing the time dependence of the dynamic moduli of a PM6M during application of 200 cycles of sinusoidal shear at 1 rad/s and 40% strain amplitude.
Figure 8:
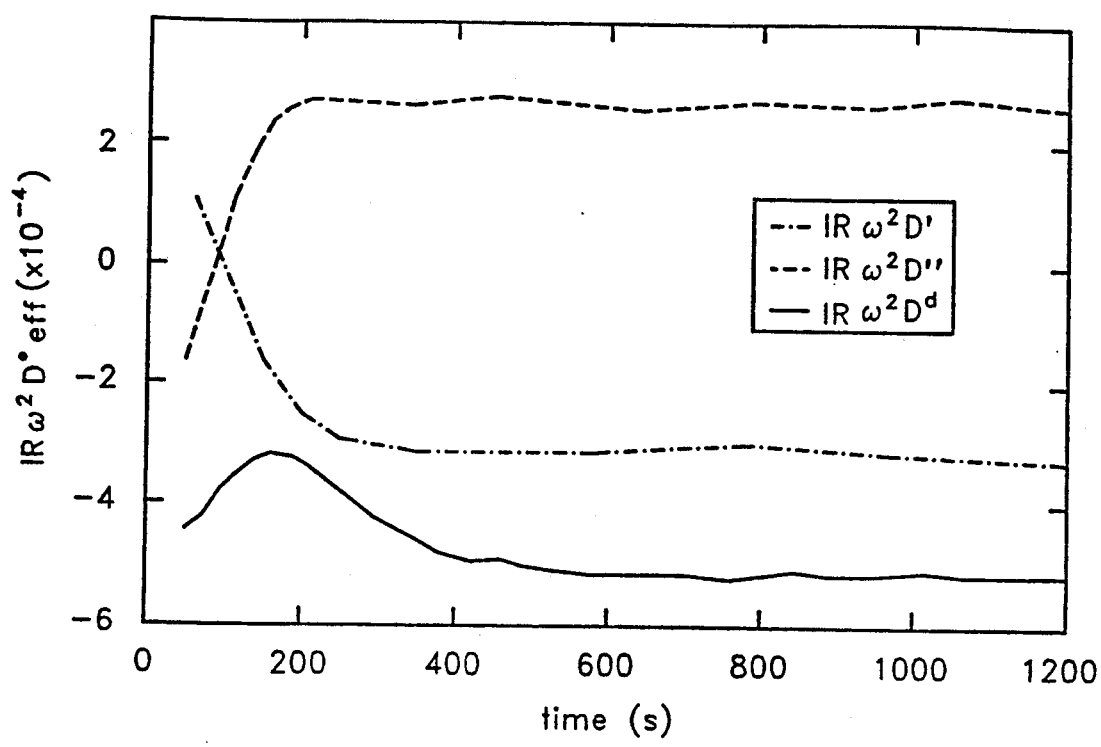
FIGS. 8 and 9 are graphs showing the time dependence.
Figure 9:
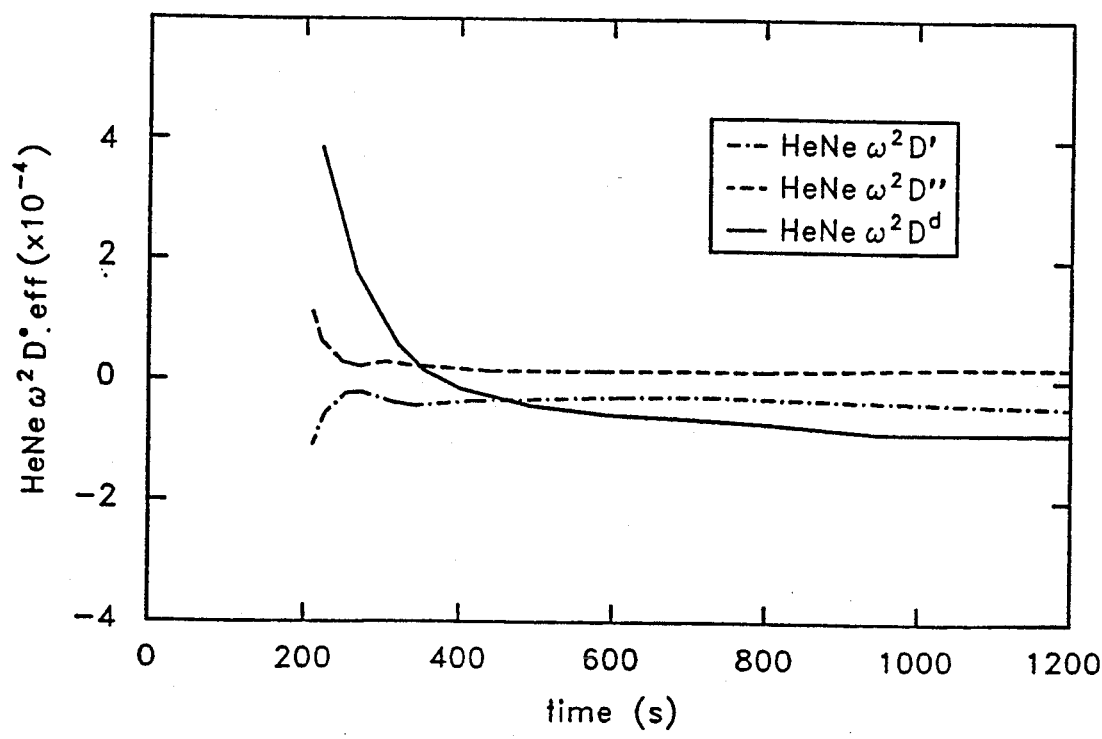

The change in the polydomain structure of the PM6M material is manifested in the variation of the effective dynamic moduli with continued shearing. The moduli measured simultaneously with the infrared turbidity are shown by the curves in FIG. 7; those measured simultaneously with the visible turbidity are shown by the markers in FIG. 7. The moduli measured in two separate examples agree excellently. The loss modulus is consistently higher than the storage modulus. Both moduli decrease with time during flow, dropping to about 90% of their initial values after 200 cycles of shear (1200s). This shows that the microstructural changes that occur during flow decrease the magnitude of the energy required to impose a 40% strain on the material. The relative magnitude of the energy stored (G') and dissipated (G") per cycle was found not to change.

The above example demonstrates a rapid and efficient method for changing PM6M from opaque to transparent by applying 200 cycles of oscillatory shear at 1 rad/s at a temperature of 110° C.

Other tests were performed with different duration, strain amplitude, shear frequency, and temperature in the nematic phase. During these tests, the dynamics during shear and after the cessation of flow were monitored. The results of these tests were as follows:

(1) For a given number of cycles, strain amplitude and temperature, there is a significant enhancement in the induced orientation as the shear frequency is reduced from 10 to 0.1 rad/s.

(2) As the strain amplitude is increased from 40% to 75% at a particular frequency and temperature the rate at which orientation is induced, the degree of orientation achieved, and the stability of the oriented state increase dramatically.

(3) When the temperature in the nematic phase of PM6M is reduced from 110° to 100° C., the shear frequencies that are effective for orienting the system shift to lower values.

Examples of other side-group liquid crystalline polymers that can be treated to convert opaque portions to transparent portions are as follows:

A polymer plate made from polyester with azobenzene mesogens having a molecular weight of approximately 100,000 g/mol is subjected to localized heating by a laser to form discrete opaque portions which are 20μ in diameter. The polymer plate has the dimensions 10 cm × 10 cm × 1 cm. The polymer plate is subjected to 100 cycles of oscillatory sinusoidal shear (10 rad/s, 100% strain) using shear plates of the type shown in FIG. 3. The polymer plate is maintained at a temperature which is 10° C. below, the nematic-to-isotropic transition temperature for the polymer. After completion of the oscillatory shear treatment, the opaqueness of the portion is substantially reduced leaving a transparent portion.

In another example, a polysiloxane copolymer of dimethyl siloxane units and units with cyano-terminated phenylbenzoate mesogens is held in a 1 mm gap between two transparent plates. A positive contrast image is written on the material using a scanned laser beam. To clear the screen in order to write a new image, an oscillatory shear is applied at room temperature, translating one plate side-to-side with 1 mm amplitude at 1 Hz for 2 min.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A method for converting an opaque portion of a side-group liquid crystalline polymer body into a transparent portion, said method comprising the step of applying sufficient shear force to said opaque portion of said side-group liquid crystalline polymer body for a sufficient time to convert said opaque portion into a transparent portion.

2. A method according to claim 1 wherein said shear force is applied to said side-group liquid crystalline polymer body as an oscillatory shear force wherein a sufficient number of oscillatory shear cycles are applied to said polymer body to convert said opaque portion into said transparent portion.

3. A method according to claim 2 wherein said oscillatory shear cycles have a frequency of between about 0.001 Hz to about 16 Hz.

4. A method according to claim 3 wherein a sufficient oscillatory shear force is applied during said shear cycles to obtain an oscillatory strain of between about 30 to 100 percent.

5. A method according to claim 4 wherein said side-group liquid crystalline polymer body is subjected to at least 100 oscillatory shear cycles.

6. A method according to claim 1 wherein said side-group liquid crystalline polymer body comprises a polymer selected from the group consisting of polyacrylate, polymethacrylate, polychloroacrylate, polysiloxane and polyvinylbenzyl-ether.

7. A method according to claim 6 wherein said side-group liquid crystalline polymer is PM6M.

8. A method according to claim 1 wherein said side-group liquid crystalline polymer is maintained at a temperature which is between $T_g$ and 5° C. below the nematic-to-isotropic transition temperature for said side-group liquid crystalline polymer during application of said shear force.

9. A method for storage of optical data wherein data is stored as one or more opaque pixels on a transparent data storage plate comprising a side-group liquid crystalline polymer, wherein the improvement comprises the step of erasing said opaque pixel by applying sufficient shear force to said opaque pixel for a sufficient time to convert said opaque pixel into a transparent one.

10. An improved method for storage of optical data according to claim 9 wherein said shear force is applied to said data storage plate as an oscillatory shear force wherein a sufficient number of oscillatory shear cycles are applied to said plate to convert said opaque pixel back into said transparent side-group liquid crystalline polymer.

11. An improved method for storage of optical data according to claim 10 wherein said oscillatory shear cycles have a frequency of between about 0.001 Hz to about 16 Hz.

12. An improved method according to claim 11 wherein a sufficient oscillatory shear force is applied during said shear cycles to obtain an oscillatory strain of between about 30 to 50 percent.

13. An improved method according to claim 12 wherein said side-group liquid crystalline polymer body is subjected to at least 100 oscillatory shear cycles.

14. An improved method according to claim 9 wherein said data storage plate comprises a side-group liquid crystalline polymer with side chains selected from the group consisting of phenylbenzoate, biphenyl, azobenzene and derivatives thereof and backbone selected from the group consisting of polyacrylate, polymethacrylate, polychloroacrylate, polysiloxane and polyvinylbenzyl-ether.

15. An improved method according to claim 14 wherein said side-group crystalline polymer is PM6M.

16. A transparent side-group liquid crystalline polymer body which is made by the method comprising the step of applying sufficient shear force to said polymer body for a sufficient time to convert any opaque portions present in said polymer body into transparent portions.

17. A transparent side-group liquid crystalline polymer body made according to the method of claim 16 wherein said shear force is applied to said side-group liquid crystalline polymer body as an oscillatory shear force wherein a sufficient number of oscillatory shear cycles are applied to said polymer body to convert any of said opaque portions into said transparent portions.

18. A transparent side-group liquid crystalline polymer body made according to the method of claim 17 wherein said oscillatory shear cycles have a frequency of between about 0.001 Hz to about 16 Hz.

19. A transparent side-group liquid crystalline polymer body made according to the method of claim 18 wherein a sufficient oscillatory shear force is applied during said shear cycles to obtain an oscillatory strain of between about 30 to 50 percent.

20. A transparent side-group liquid crystalline polymer body made according to the method of claim 19 wherein said side-group liquid crystalline polymer body is subjected to at least 100 oscillatory shear cycles.

21. A transparent side-group liquid crystalline polymer body made according to the method of claim 16 wherein said side-group liquid crystalline polymer body comprises a polymer with side chains selected from the group consisting of phenylbenzoate, biphenyl, azobenzene and derivatives thereof and backbone selected from the group consisting of polyacrylate, polymethacrylate, polychloroacrylate, polysiloxane and polyvinylbenzylethyl.

22. A transparent side-group liquid crystalline polymer body made according to the method of claim 21 wherein said side-group liquid crystalline polymer is PM6M.

23. A transparent side-group liquid crystalline polymer body made according to the method of claim 16 wherein side-group liquid crystalline polymer is maintained at a temperature which is between $T_g$ and 5° C. below the nematic-isotropic transition for said side-group liquid crystalline polymer body during application of said shear force.

* * * * *